Nov. 14, 1967  R. O. LINK ET AL  3,352,012
WIRE CUTTER
Filed March 23, 1965
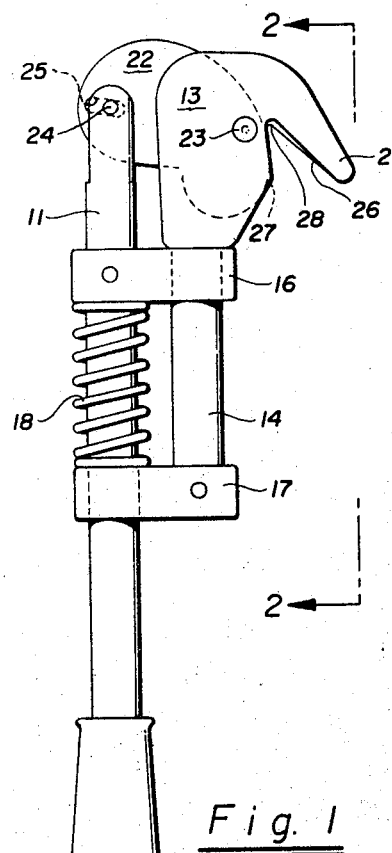
Fig. 1
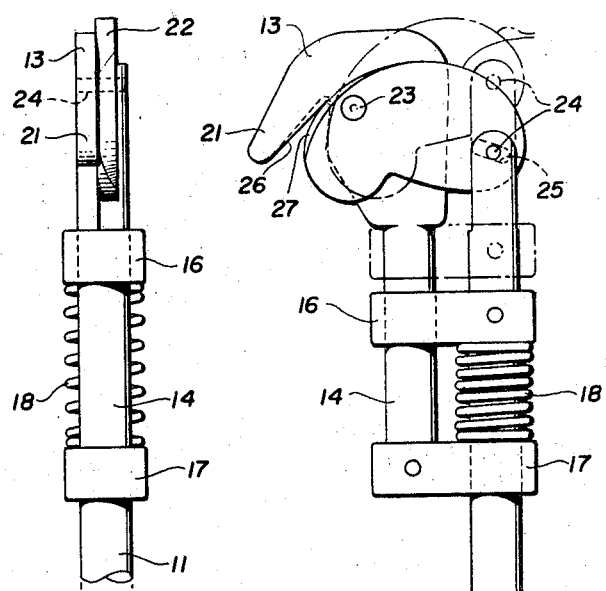
Fig. 2
Fig. 3
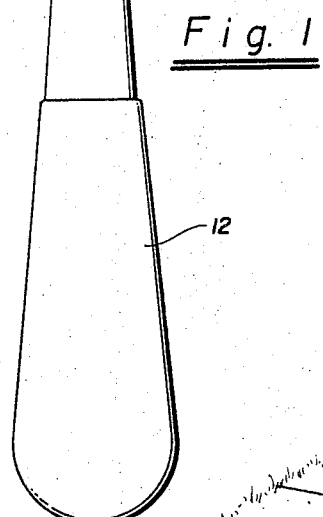
Fig. 4
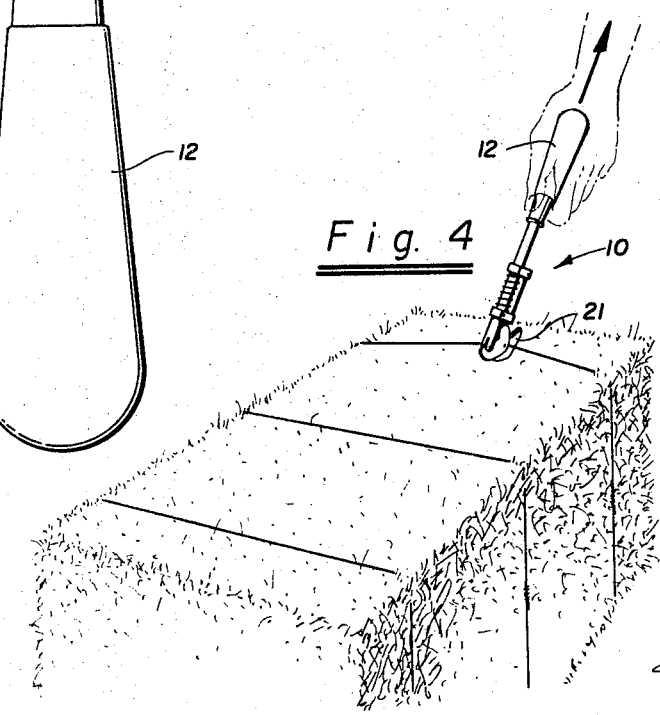
INVENTOR.
Robert O. Link
George W. Morse
Attorneys

United States Patent Office 3,352,012
Patented Nov. 14, 1967

3,352,012
WIRE CUTTER
Robert O. Link, Rte. 1, Box 1362, and George W. Morse, P.O. Drawer Z, both of Elk Grove, Calif. 95624
Filed Mar. 23, 1965, Ser. No. 442,091
2 Claims. (Cl. 30—246)

This invention relates to cutting tools for wire and the like.

Many materials are now being compressed in the form of bales or bundles which are held together by wires or cords applied by a baling or bundling machine. For example, there are many crops which are transported from the growing areas to processing and storage areas in the form of bales which are tied by wires or cords which must be cut or broken before the material can be consumed or introduced into subsequent processing steps. Conventionally, many wire cutting tools and methods have been used for this purpose, such as hand axes, pliers, side cutters, and the like. While such devices may be satisfactory for a small number of bales, when thousands of bales are involved the use of such devices is unsatisfactory due to such disadvantages as the amount of effort required, possible injury to the baled material and hazards to the workmen.

Accordingly, it is an object of the invention to provide a novel wire cutting tool which will overcome the above named limitations and disadvantages.

It is another object of the invention to provide a tool of the above mentioned character which will cut the baling wires as it is drawn in a single pass across the baled material.

It is another object of the invention to provide a tool of the above character in which the motion of pulling the tool across the top of the bale automatically actuates cutting means to cut the wires.

Another object of the invention is to provide a tool of the above character which is simple in construction and yet positive in cutting action.

It is another object of the invention to provide a tool of the above character which after each cutting operation automatically resets itself to an open wire receiving position.

Additional objects and features of the invention will appear from the following description in which the preferred embodiment is set forth in detail in conjunction with the accompanying drawings of which:

FIGURE 1 is a side elevational view of a wire cutting tool constructed according to our invention.

FIGURE 2 is an end view of the tool taken along the lines 2—2 of FIGURE 1.

FIGURE 3 is a side elevational view of that side of the tool opposite to that shown in FIGURE 1, and illustrating the tool in closed, wire-cutting position.

FIGURE 4 is a view in perspective depicting the manner of use of our tool for cutting the wires of baled goods.

In general, our invention consists of a support bar having a handle fixed to its one end and a pair of cutting jaws at the other end. One of the cutting jaws is so constructed that when the tool is dragged across a bale toward a wire, the wire is automatically engaged between the cutting edges of the jaws. The operating means for the jaws is such that the jaws are moved to closed, wire-cutting position by a pull applied to the handle in a direction away from the engaged wire.

In the particular embodiment illustrated, our wire cutter consists of a support bar 11 having a handle 12 affixed to its one end. The wire cutting means includes a cutting jaw 13 fixed to a slide bar 14. The latter is carried by suitable guide means, such as guide bearings 16 and 17, for sliding movement along the length of bar 11. As shown, bearing 16 is fixed to the support bar 11, while bearing 17 is fixed to the slide bar 14. The hook-like cutting jaw 13 is yieldably urged towards the handle end of the support bar 11 by a coiled compression spring 18. One end of this spring seats upon bearing 16, and the other end on bearing 17. The spring surrounds and is retained upon the bar 11. A portion 21 of jaw 13 is directed towards the handle 12 and at an angle of less than 90° with respect to the bar 11 to facilitate engagement with a wire or cord.

A link-like cutting jaw 22 is pivotally connected to the jaw 13 by pivot 23 and is connected to the support bar 11 by a pin and slot connection consisting of a pin 24 mounted in the bar 11 and a slot 25 provided in the jaw 22. The jaw 13 is provided with a straight cutting edge 26 and the link-like jaw is provided with an opposed curved cutting edge 27. As shown in FIGURE 3, relative movement of the hook-like jaw 13 away from the handle causes the pin and slot connection to pull the jaw 22 about the pivot 23 to thereby cause the jaws to move from an open to a closed, wire-cutting position.

Operation of our cutter can be best explained with reference to FIGURES 3 and 4. Normally, the jaws are urged to open, wire-receiving position by the spring 13. To cut a wire, the cutter is drawn across the top of a bale 29 to snag the wire 31 and catch it at the bottom 28 of the jaw 13. Upon continuing to pull the tool across the bale, the wire 31 applies a restraining force to the hook-like jaw 13 and slide bar 14 near the connection and in a direction away from the handle. This force causes the link-like jaw 22 to move about the pivot 23 and to bring the cutting edges 26 and 27 across each other (i.e. in cooperative cutting relation) to cut the wire. The changing distance between the pivot 23 and the pin 24 is accommodated by the slot 25. After a wire cutting operation, the spring 18 resets the jaws 13 and 22 in open position.

It will be evident from the foregoing that we have provided a unique cutter for one-handed cutting of wire-like bindings. Our tool operates with a minimum of motion, requiring but a single pass across the wires of a bale to automatically cut the wires.

We claim:

1. A cutting tool for wire and the like comprising a support bar, a handle affixed to one end of the bar and, wire cutting means operatively disposed at the other end of the bar, said wire cutting means including a slide bar, a hook-like cutting jaw fixed to a said slide bar and adapted to engage a wire to be cut, in cooperation with a link-like cutting jaw pivotally connected to said hook-like cutting jaw, said jaws having opposed cutting edges and being movable relative to each other between open wire-receiving and closed wire-cutting positions, a pair of guide members mounting the slide bar for sliding movement along the length of the bar, one of said guide members being fixed to the support bar and receiving the slide bar for sliding movement therein, the other of said guide members being fixed to the end of the slide bar and receiving the support bar for sliding movement thereon, a compression spring having its ends seated against the guide member, pin and slot connection means pivotally connecting said link-like jaw to the support bar said link-like jaw being provided with a curved cutting edge opposed to the cutting edge of said hook-like jaw so that as said hook-like jaw moves away from the handle by the restraining force of a wire to be cut, the pin and slot connection means causes the link-like jaw to pivot with respect to the hook-like jaw to bring the cutting edges of said jaws into a cooperative cutting relationship.

2. In a cutting tool for cutting a wire on a bale of hay, an elongate first member, a handle mounted on said first member and adapted to be grasped by one hand, said handle being relatively short in comparison to the length of the elongate first member, a second member, guide means slidably mounting said second member on said first member for movement in a direction substantially parallel to the longitudinal axis of said first member between first and second positions, said guide means including a pair of guide elements mounted on said first and second members, one of said elements being fixed to said first member and the other of said elements being fixed to said second member, spring means connected to said second member for yieldably urging said second member to said first position in any position of said cutting tool, said second member in either of said first and second positions being spaced a substantial distance from the handle so that said second member does not impede the grasping of the handle with one hand, a hook-like cutting jaw mounted on said second member facing in a direction parallel to the axis of the handle, an additional cutting jaw, first pivot means pivotally connecting said additional cutting jaw to said first member and second pivot means spaced from said first pivot means pivotally connecting said additional cutting jaw to said hook-like cutting jaw, said additional cutting jaw being in an open position when said second member is in its first position to permit a wire to enter the hook-like cutting jaw and in a closed position when said second member is in its second position, said tool being capable of being held and operated with one hand by one continuous movement of said hand in one direction by using said hand to pull the hook-like jaw of the cutting tool into the wire to be cut and then to continue pulling of the cutting tool with said one hand in the same direction to cause movement of said second member to said second position to cause said additional cutting jaw to move into a closed wire cutting position with respect to said hook-like cutting jaw against the force of the yieldable means to cut the wire.

References Cited

UNITED STATES PATENTS

| | | | |
|---|---|---|---|
| 222,244 | 12/1879 | Cole et al. | 30—246 |
| 958,587 | 5/1910 | Brooks | 30—246 |
| 1,172,687 | 2/1916 | Eckman | 30—246 X |
| 1,746,073 | 2/1930 | Dagley | 30—246 |
| 2,423,723 | 7/1947 | Page | 30—246 X |

WILLIAM FELDMAN, *Primary Examiner.*

J. C. PETERS, *Assistant Examiner.*